US011138641B2

United States Patent
Blair, II et al.

(10) Patent No.: US 11,138,641 B2
(45) Date of Patent: Oct. 5, 2021

(54) SYSTEMS AND METHODS FOR PROVIDING LOCATION-BASED TIME-LIMITED SERVICES

(71) Applicant: Walmart Apollo, LLC, Bentonville, AR (US)

(72) Inventors: Richard Montgomery Blair, II, Bentonville, AR (US); William Ross Allen, Pea Ridge, AR (US); Shaun Mcrae Smith, Gravette, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 354 days.

(21) Appl. No.: 16/002,404

(22) Filed: Jun. 7, 2018

(65) Prior Publication Data

US 2018/0357686 A1 Dec. 13, 2018

Related U.S. Application Data

(60) Provisional application No. 62/517,551, filed on Jun. 9, 2017.

(51) Int. Cl.
*G06Q 30/02* (2012.01)
*H04W 4/021* (2018.01)
(Continued)

(52) U.S. Cl.
CPC ... *G06Q 30/0283* (2013.01); *G06F 16/90335* (2019.01); *G06Q 10/087* (2013.01); *H04W 4/021* (2013.01)

(58) Field of Classification Search
CPC ........ G06Q 30/00; G06Q 30/02; G06Q 30/06; G06Q 10/08; G05B 19/00
(Continued)

(56) References Cited

U.S. PATENT DOCUMENTS 5,717,866 A * 2/1998 Naftzger ............... G06Q 30/02
  705/14.38
8,392,281 B1 * 3/2013 Bashir .................. G06Q 30/02
  705/26.7
(Continued)

OTHER PUBLICATIONS

Invitation to pay Additional Fees and Where Applicable, Protest Fee for PCT/US2018/036454 dated Jul. 24, 2018, pp. 1-2.
(Continued)

*Primary Examiner* — Olusegun Goyea
(74) *Attorney, Agent, or Firm* — Fitch, Even, Tabin & Flannery LLP

(57) ABSTRACT

Systems, methods, and machine readable media are provided for location-based time-limited services. In exemplary embodiments, one or more beacons are disposed within a facility to define a geo-fenced zone. A dynamic notification module implemented in a server receives a notification that a client device is within the geo-fenced zone and determines that the device meets designated criteria based on the device interacting with the beacons at a designated time. The dynamic notification module transmits a first message to the device that includes item information associated with the geo-fenced zone, receives a response to the first message at a subsequent time and in response transmits instructions to the device to execute a time-limited service. Subsequently, the dynamic notification module transmits a second message to the device including information for a complementary item and a dynamic sale price for the complementary item.

20 Claims, 8 Drawing Sheets

(51) Int. Cl.
*G06Q 10/08* (2012.01)
*G06F 16/903* (2019.01)

(58) Field of Classification Search
USPC ....... 705/14.35, 14.52, 14.58, 71, 330, 26.7, 705/14.38, 14.25, 26.3, 7.11
See application file for complete search history.

(56) References Cited

U.S. PATENT DOCUMENTS

| | | | |
|---|---|---|---|
| 9,324,091 | B2 | 4/2016 | Randell et al. |
| 2004/0015415 | A1* | 1/2004 | Cofino .............. G06Q 30/0611 705/7.11 |
| 2010/0017022 | A1* | 1/2010 | Walker .................. G06Q 30/06 700/232 |
| 2010/0151821 | A1 | 6/2010 | Sweeney et al. |
| 2013/0046595 | A1 | 2/2013 | Wu et al. |
| 2013/0325612 | A1 | 12/2013 | Sommerville et al. |
| 2013/0332274 | A1 | 12/2013 | Faith et al. |
| 2014/0032295 | A1 | 1/2014 | Cantrell |
| 2014/0085180 | A1* | 3/2014 | Bender .................. G09G 5/00 345/156 |
| 2014/0095285 | A1* | 4/2014 | Wadell .................. G06Q 30/00 705/14.25 |
| 2014/0149202 | A1 | 5/2014 | Owen |
| 2014/0258007 | A1* | 9/2014 | Calman ................ G06Q 20/127 705/16 |
| 2014/0316875 | A1* | 10/2014 | Tkachenko ........ G06Q 30/0224 705/14.25 |
| 2015/0120453 | A1 | 4/2015 | Lee et al. |
| 2015/0193724 | A1* | 7/2015 | Stevens ................ G06Q 10/083 705/330 |
| 2015/0278865 | A1 | 10/2015 | Jain et al. |
| 2015/0348146 | A1* | 12/2015 | Shanmugam ...... G06Q 20/3224 705/71 |
| 2015/0363816 | A1 | 12/2015 | Poglitsch |
| 2016/0098742 | A1* | 4/2016 | Minicucci .......... G06Q 30/0226 705/14.27 |
| 2016/0260296 | A1 | 9/2016 | Shirriff et al. |
| 2016/0321687 | A1* | 11/2016 | Howe ................ G06Q 30/0206 |
| 2017/0055120 | A1 | 2/2017 | Shaffer et al. |

OTHER PUBLICATIONS

International Search Report and Written Opinion for Application No. PCT/US2018/036454, dated Oct. 3, 2018, 17 pages.

* cited by examiner

SYSTEMS AND METHODS FOR PROVIDING LOCATION-BASED TIME-LIMITED SERVICES

RELATED APPLICATION

This application claims priority to U.S. Provisional Application No. 62/517,551 filed on Jun. 9, 2017, the contents of which is hereby incorporated by reference in its entirety.

BACKGROUND

Beacons may be used to transmit an identifier that uniquely identifies the transmitting beacon. For example, a Bluetooth® low energy beacon may transmit an identifier that may be detected by a mobile device. The detected identifier may be provided to a mobile application executing on the mobile device that may provide the identifier to a remote server. The remote server may compare the identifier against a database of previously recorded beacon locations to determine a location for the mobile device. Beacons may also be used to transmit other data to devices within range.

SUMMARY

One embodiment includes a system for providing location-based time-limited services. The system includes one or more beacons disposed at first locations within a facility. The beacons define a first geo-fenced zone within a portion of the facility that is less than all of the facility. The system also includes a server equipped with a processor configured to execute a dynamic notification module. The dynamic notification module, when executed, receives a notification that a client device associated with a user is within the first geo-fenced zone and determines that the client device meets designated criteria based on the client device interacting with the one or more beacons at a designated time. The dynamic notification module transmits a first message to the client device that includes item information associated with the first geo-fenced zone in response to determining that the client device traversed the first geo-fenced zone at the designated time. The first message requests a response at a subsequent time. The dynamic notification module receives a response to the first message from the client device at the subsequent time, and in response, transmits instructions to the client device to execute a time-limited service associated with the item and the portion of the facility. The dynamic notification module also determines a dynamic sale price for a complementary item, where the dynamic sale price is determined based on the user responding to the first message. The dynamic notification module transmits a second message to the client device that includes information for the complementary item and the dynamic sale price.

Another embodiment includes a method for providing location-based time-limited services. The method includes disposing one or more beacons at first locations within a facility to define a first geo-fenced zone within a portion of the facility that is less than all of the facility. The method further includes receiving, at a dynamic notification module, a notification that a client device associated with a user is within the first geo-fenced zone and determining that the client device meets designated criteria based on the client device interacting with the one or more beacons at a designated time. The method also includes transmitting a first message from the dynamic notification module to the client device that includes item information associated with the first geo-fenced zone in response to determining that the client device traversed the first geo-fenced zone at the designated time. The first message requests a response at a subsequent time. The method includes receiving a response to the first message at the dynamic notification module at the subsequent time, and in response transmitting instructions to the client device to execute a time-limited service associated with the item and the portion of the facility. The method includes determining a dynamic sale price for a complementary item, where the dynamic sale price is determined based on the user responding to the first message. The method further includes transmitting a second message to the client device including information for the complementary item and the dynamic sale price for the complementary item.

Another embodiment includes a non-transitory machine-readable medium storing instructions executable by a processing device, where execution of the instructions causes the processing device to implement a method for providing location-based time-limited services. The method includes transmitting a signal from one or more beacons disposed at first locations within a facility, where the beacons define a first geo-fenced zone within a portion of the facility that is less than all of the facility. The method also includes receiving a notification that a client device associated with a user is within the first geo-fenced zone and determining that the client device meets designated criteria based on the client device interacting with the one or more beacons at a designated time. The method further includes transmitting a first message to the client device that includes item information associated with the first geo-fenced zone in response to determining that the client device traversed the first geo-fenced zone at the designated time. The first message requests a response at a subsequent time. The method includes receiving a response to the first message from the client device at the subsequent time, and in response transmitting instructions to the client device to execute a time-limited service associated with the item and the portion of the facility. The method includes determining a dynamic sale price for a complementary item, where the dynamic sale price is determined based on the user responding to the first message. The method further includes transmitting a second message to the client device including information for the complementary item and the dynamic sale price for the complementary item.

In one embodiment, a system for providing location-based queue services is disclosed. The system includes a Near-Field-Communication (NFC) device disposed at a first location within a facility. The NFC device is associated with a product and is configured to transmit a product identifier identifying the product to a client device when the client device is within range of the NFC device. The system also includes a server. The server is configured to receive the product identifier from the client device in response to the client device detecting a signal from the NFC device. The server is further configured to receive a user identifier from the client device, and add the user identifier to a digital queue stored in a database for purchasing the product associated with the NFC device. The server is also configured to subsequently transmit instructions to the client device to execute a purchase transaction for the product associated with the NFC device.

In another embodiment, a method for providing location-based queue services is disclosed. The method includes disposing a Near-Field-Communication (NFC) device at a first location within a facility. The NFC device is associated with a product. The method includes transmitting a product identifier identifying the product associated with the NFC device to a client device when the client device is within range of the NFC device. The method further includes receiving the product identifier from the client device at a server in response to the client device detecting a signal from the NFC device, and receiving a user identifier from the client device at the server. The method also includes adding the user identifier to a digital queue stored in a database for purchasing the product associated with the NFC device, and subsequently transmitting instructions to the client device to execute a purchase transaction for the product associated with the NFC device.

BRIEF DESCRIPTION OF THE DRAWINGS

The accompanying drawings, which are incorporated in and constitute a part of this specification, illustrate one or more embodiments of the invention and, together with the description, help to explain the invention. The embodiments are illustrated by way of example and should not be construed to limit the present disclosure. In the drawings.

DETAILED DESCRIPTION

Figure 1:
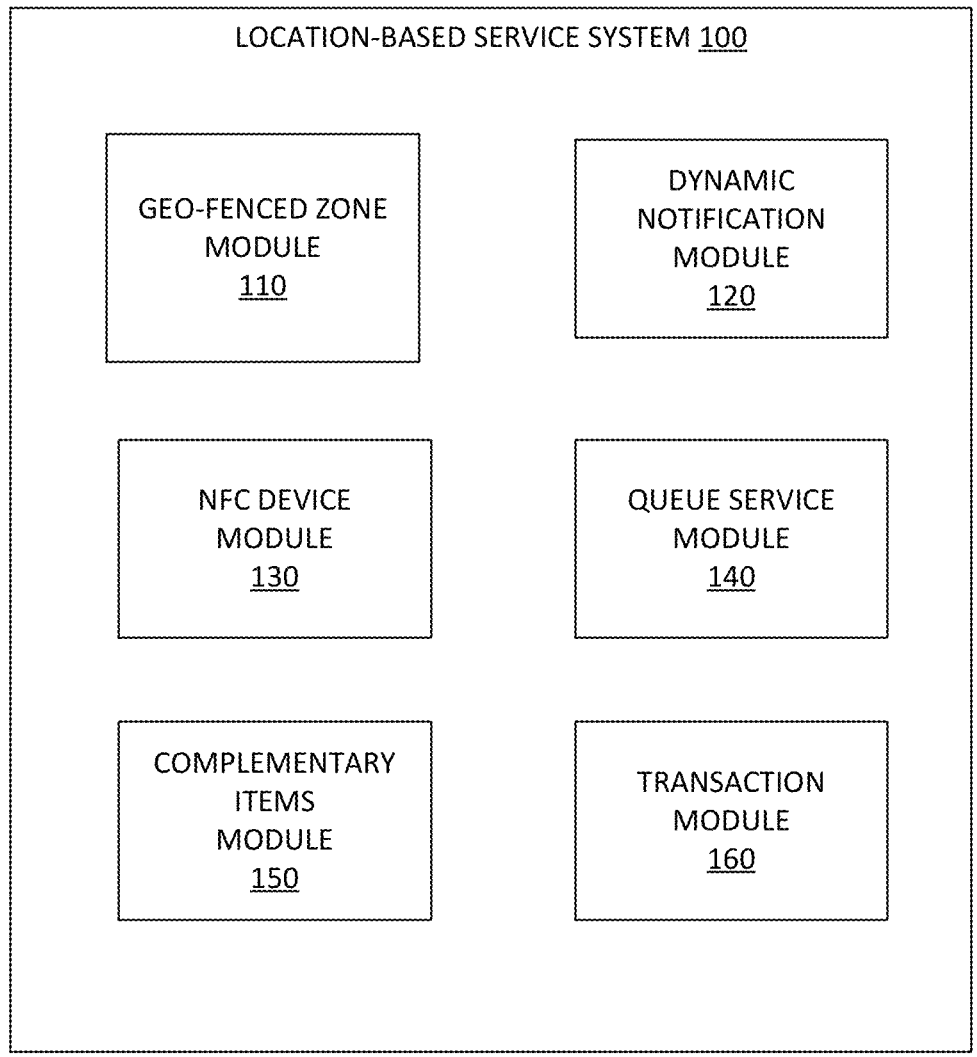
FIG. 1 is a block diagram showing a location-based service system in terms of modules, according to an example embodiment.

Exemplary embodiments provide a location-based service system for providing time-limited services and queue position services to users. In one embodiment, the location-based service system is configured to determine that a client device entered or traversed a geo-fenced zone within a facility at a designated time, and communicate a message to the client device that includes information related to an item associated with the geo-fenced zone. The user can respond to the message to receive instructions to execute a time-limited service relating to the item. The execution of the time-limited service includes completing a purchase transaction within a designated time period for the item associated with the geo-fenced zone. In another embodiment, the location-based service system is configured to determine that a client device detected a signal from a NFC device, and communicate a message to the client device that includes information related to an item associated with the NFC device. The location-based service system adds the user to a digital queue for purchasing the item associated with the NFC device. In an example embodiment, the location-based service system also communicates information related to one or more complementary items to the client device, where the complementary items complement the item associated with the geo-fenced zone or the item associated with the NFC device. In some embodiments, the complementary item(s) may be offered at a sale price dynamically determined by the location-based service system.

In one embodiment, the location-based service system includes one or more beacons establishing geo-fenced zones in a facility, a mobile application executing on a client device, and software code executing on a server to perform certain functions. The client device may include a software application configured to listen in the background for either signal transmissions from the beacons in the facility or to detect the client device traversing a geo-fenced zone in the facility (e.g. the location of the client device traversing a geo-fence may also be established using WLAN, infrared, RFID/Near Field Communication or other location-based services (LBS) or near LBS). After the client device passes through the geo-fenced zone the application on the client device may confirm a time period for completing purchase of an item associated with the geo-fenced zone traversed by the user without the user having to stand in line. During this transaction the user may also be prompted with complementary items (i.e. tag-on items) for the item. For example, if the item is a television, then the complementary items may be television cables, television mounts, DVD or Blu-ray player, etc. In some embodiments, the user is able to pick up the item purchased via the client device at the facility. In other embodiments, the user is able to pick up the item purchased via the client device at another facility. In other embodiments, the item purchased via the client device is delivered to the user at a specified address (e.g., user's home address).

In one embodiment, the location-based service system allows users to maintain a position "in line" while they continue to shop in the store. The location-based service system backend software services interacting with a software application on a client device, and a near field communication (NFC) device. The NFC device is setup near a particular product that is offered to users via a sales event. Instead of moving all of the product out to the floor before the sales event begins, the NFC device is setup on the sales floor of the store. The actual product may be kept in a storage room to prevent users from congregating around the product on the store floor, and to reduce setup time and space for the sales event. There may be a sign or electronic display instructing or informing users on how to interact with the NFC device in order to participate in the sales event and secure his or her position in line for the product associated with the NFC device. The sign or electronic display may also include information related to the product associated with the NFC device. In order to enter the digital queue, the client device responds to the NFC device request for communication. In an example embodiment, once a client device with a pre-installed application is in proximity of the NFC device or within range of the NFC device, an event is triggered to add the user to the digital queue for the corresponding product. In one embodiment, the application on the client device may prompt the user to complete purchase of the item if he or she wishes to leave the store, and secure his or her spot in the line upon receiving payment. In another embodiment, the location-based service system may require the user to allow location tracking of the client device, and the system maintains the user's position in the digital queue while the device remains in the store. In some embodiments, once the user's position in the digital queue is secured, the location-based service system provides recommendations to the user regarding complementary items (i.e. tag-on items) via push notifications to the client device. The client device enables the user to add the complementary items to the purchase order, and the user can complete purchase of the product associated with the NFC device and the added complementary items together. In some embodiments, the location-based service system sends a push notification to the client device when the purchased items are available for pick-up in the store.

The location-based service system described herein leverages beacons, geo-fenced zones and NFC devices to alleviate lines at sale events and allow users to more freely shop the store during sale events. The location-based service system also reduces the number of associates or employees need on the floor at the store, reduces the need for security personnel, and reduces the amount of product put on display on the store floor.

Figure 7:
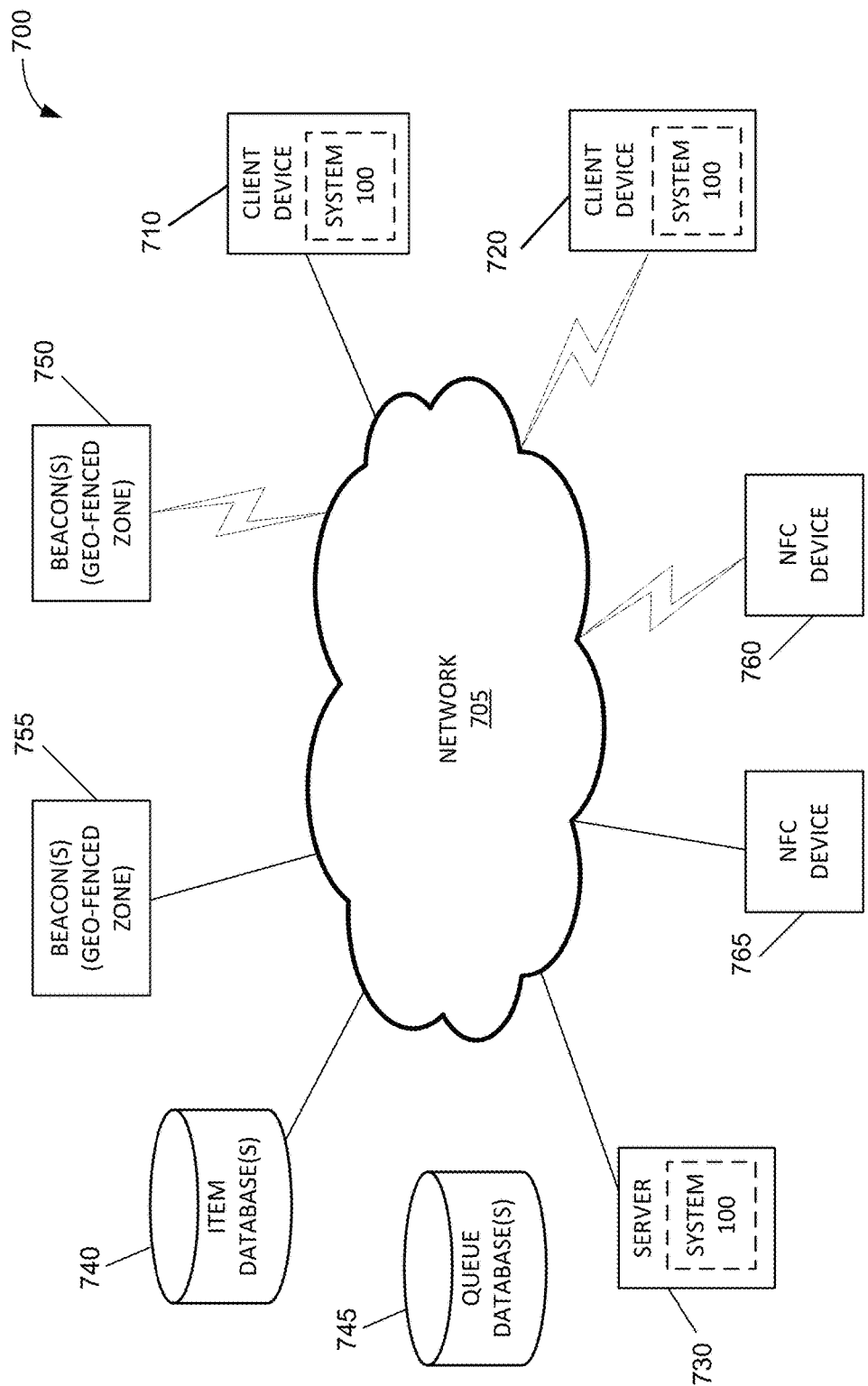
FIG. 7 is a diagram of an exemplary network environment suitable for a distributed implementation of exemplary embodiments.

FIG. 1 is a block diagram showing a location-based service system 100 in terms of modules according to an example embodiment. One or more of the modules may be implemented using server 730 as shown in FIG. 7, while other modules may be implemented using client devices 710, 720 as shown in FIG. 7. The modules include a geo-fenced zone module 110, a dynamic notification module 120, a NFC device module 130, a queue service module 140, a complementary items module 150, and a transaction module 160. The modules may include various circuits, circuitry and one or more software components, programs, applications, or other units of code base or instructions configured to be executed by one or more processors. Although modules 110, 120, 130, 140, 150, and 160 are shown as distinct modules in FIG. 1, it should be understood that modules 110, 120, 130, 140, 150, and 160 may be implemented as fewer or more modules than illustrated. It should be understood that any of modules 110, 120, 130, 140, 150 and 160 may communicate with one or more components included in system 700 (FIG. 7), such as client devices 710, 720, server 730, database(s) 740, 745, beacons 750, 755 and NFC devices 760, 765.

The geo-fenced zone module 110 may be configured to manage data and information related to beacons disposed within the facility, and manage information related to one or more geo-fenced zones defined within the facility. The geo-fenced zone module 110 may also be configured to store item information associated with a particular geo-fenced zone.

The dynamic notification module 120 may be configured to detect a client device traversing a geo-fenced zone or interacting with an NFC device, and communicate a time-limited service to the client device when the device meets designated criteria.

The NFC device module 130 may be configured to manage data and information related to one or more NFC devices disposed within the facility. The NFC device module 130 may also be configured to store item information associated with a particular NFC device.

The queue service module 140 may be configured to identify and manage a user's position within a queue for an item associated with a NFC device based on a client device interacting with the NFC device.

The complementary item module 150 may be configured to analyze item information and determine one or more complementary items for the item. The complementary item module 150 may also be configured to communicate information related to the complementary item to the client device.

The transaction module 160 may be configured to manage and facilitate purchase transactions based on the time-limited service communicated to the client device and/or the user's position in the queue for an item.

Figure 2:
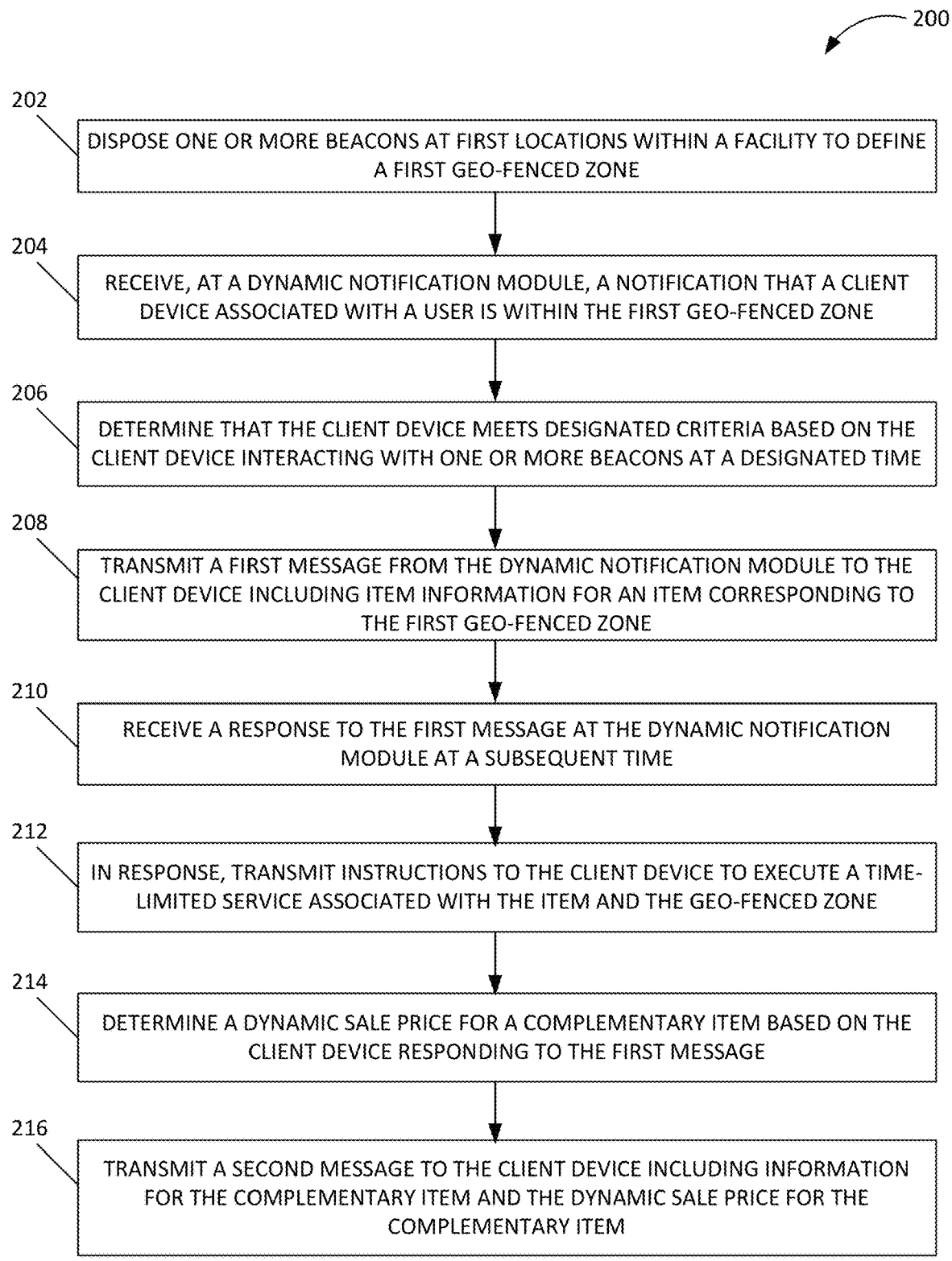
FIG. 2 is a flowchart illustrating an exemplary method for providing location-based time-limited services, according to an example embodiment.

FIG. 2 is a flowchart illustrating an exemplary method 200 for providing a location-based time-limited service, according to an example embodiment. The method 200 may be performed using one or more modules of system 100 described above.

At step 202 one or more beacons are disposed at first locations within a facility to define a geo-fenced zone within the facility. The geo-fenced zone is a portion of the facility that is less than the whole facility. In some embodiments, multiple geo-fenced zones are defined within the facility. In an example embodiment, a first geo-fenced zone may overlap a second geo-fenced zone. The geo-fenced zone module 110 manages and stores information relating to the location of each beacon, and the area within the facility covered by each geo-fenced zone. An item corresponds to each geo-fenced zone. In an example embodiment, multiple items may correspond to a geo-fenced zone. The geo-fenced zone module 110 manages and stores data indicating which item corresponds to which geo-fenced zone. In an example embodiment, the beacons are configured to include an item identification number in the signal broadcasted by the beacons.

At step 204, the dynamic notification module 120 receives a notification that a client device associated with a user is within the first geo-fenced zone. In an example embodiment, the dynamic notification module 110 determines that the client device is within the first geo-fenced zone based on a location of the client device within the facility. In an example embodiment, the dynamic notification module 110 determines that the client device is within the first geo-fenced zone based on the client device detecting a signal transmitted by the beacons that includes beacon identifiers and a mobile application on the client device providing the beacon identifiers to the dynamic notification module 120 which is executing on a remote server. The remote server maps the received identifiers to stored locations of the beacons associated with the identifiers to determine the client device location. In another embodiment, another type of LBS or near LBS service is used to determine the location of the client device and the mobile application provides the location to the dynamic notification module 120 which determines the presence of the client device within a geo-fenced zone.

At step 206, the dynamic notification module 120 determines that the client device meets designated criteria based on the client device interacting with one or more of the beacons defining the first geo-fenced zone at a designated time. To participate in the time-limited service, the user may have to traverse the geo-fenced zone at a designated time. The designated time may be a particular date and a time on that date. The time may be before or at the start of a sales event or time-limited service. The designated criteria may include the client device having a pre-installed application to participate in the time-limited service, or a user associated with the client device being a priority customer based on previous purchase patterns. In an example embodiment, the designated criteria requires the user to participate in a first time-limited service or sales event for a first item, to be able to participate in a second time-limited service or sales event for a second item that is a complementary item for the first item. The designated criteria may require the user to be physically near or proximate the second item.

At step 208, the dynamic notification module 120 transmits a first message to the client device that includes item information for an item associated with the first geo-fenced zone. The first message requests a response from the user at a subsequent time. In an example embodiment, the first message transmitted to the client device includes information for the item that corresponds to the first geo-fenced zone, price information for the item, and a time period for when the price information is valid for the item. The time period may include a start time and an expiration time for the price for the item. The first message may request a response from the user after a start time and before the expiration time. Alternatively, the first message may request a response before the expiration time. Further the first message may request a response before the start time.

At step 210, the dynamic notification module 120 receives a response to the first message from the client device at a subsequent time. The response to the first message from the client device to the dynamic notification module 120 may indicate the user's interest to participate in a time-limited service associated with the first geo-fenced zone.

At step 212, the dynamic notification module 120 transmits instructions to the client device, in response to receiving the response at step 210, to execute a time-limited service associated with the item and the first geo-fenced zone. The time-limited service enables the user to purchase the item associated with the first geo-fenced zone at the price specified in the first message. The price specified in the first message may be valid for a limited time period, which is also specified in the first message. In an example embodiment, the user is required to be within the facility to complete purchase of the item via his or her client device within the specified time period. In another embodiment, the user can complete purchase of the item within the specified time period via the client device while he or she is outside of the facility.

At step 214, the dynamic notification module 120 determines a dynamic sale price for a complementary item based on the client device responding to the first message. In an example embodiment, the dynamic sale price may be determined based on other factors, including but not limited to, user's purchase history, user demographic information, and the like. In an example embodiment, the dynamic sale price may be determined based on the user satisfying a pre-defined criteria that may be defined by the product manufacturer or product supplier. The complementary items module 150 may analyze the item associated with the first geo-fenced zone, and determine one or more complementary items. As used herein, a complementary item may be an item that complements the item associated with a geo-fenced zone, an item that is an accessory to the item associated with a geo-fenced zone, an item that may be used with the item associated with a geo-fenced zone, and the like. The complementary item may also be referred to as an add-on item or tag-on item. In one embodiment, the complementary item may be determined based on items frequently bought with the item associated with the geo-fenced zone as reflected in a database holding purchase records. For example, the item offered in the time-limited service may be a television. The complementary items module 150 may retrieve one or more complementary items that are frequently bought with a television from a stored list in a database. The complementary items may include television cables, television wall mounts, television stand, a DVD player, a Blu-ray player, a DVD player, and the like. The complementary items may be compatible with the particular model of television offered in the time-limited service. In another embodiment, the complementary items module 150 dynamically analyzes the user's purchase history to determine complementary items. For example, for a television, the complementary items module 150 may determine one or more complementary items, based on the user's purchase history, as a Blu-ray disc for "Rogue One: A Star Wars Story."

At step 216, the dynamic notification module 120 subsequently transmits a second message to the client device that includes information for a complementary item and the dynamic sale price for the complementary item. In an example embodiment, the complementary items module 150 transmits the second message to the client device in response to the client device executing the time-limited service to purchase the item associated with the first geo-fenced zone.

In one embodiment, one or more beacons are disposed at a second location within the facility and define a second geo-fenced zone within a portion of the facility that is less than all of the facility. The complementary items module 150 may be configured to transmit the second message to the client device based on a location of the client device traversing the second geo-fenced zone within the facility, where the second geo-fenced zone is in the portion of the facility where the complementary item is offered for sale. That is, the location-based service system 100 sends a notification to the client device including information for a complementary item when the user is in the area where the complementary is sold. In an example embodiment, the complementary items module 150 may identify one or more items available within the second geo-fenced zone that complements the item associated with the first geo-fenced zone. In this manner, the location-based service system 100 detects that the user is browsing items in a particular department, and notifies the user of item(s) that complement the item he or she purchased or is interested in purchasing as part of the time-limited service transmitted to his or her client device. Additionally, the location-based service system 100 communicates a dynamically determined sale price for the complementary item to the client device.

In some embodiments, the location-based service system 100 is configured to query a database storing inventory information for the facility, and determine whether the item or items purchased by the user via the time-limited service are available for pickup at the facility based on the inventory available at the facility, or whether the item or items are only available for delivery. The client device may receive a notification from the location-based service system 100 displaying a determination as to whether the item(s) is available for pickup at the facility or the item(s) is available for delivery.

In an example embodiment, if the item is only available for delivery, the user can select an address or method for delivery. One of the delivery options is to ship the item to the facility. The user may realize additional savings by choosing to have the item shipped to the facility, rather than a home or business address.

In an example embodiment, the system 100 may offer additional savings when the user purchases more items within the same transaction. The additional savings may be based on multiple factors, including but not limited to business objectives for items, sale strategy for items, forecasted sale trend for items, user demographics, past user purchase history, items purchased in the transaction, total transaction amount, and others.

Figure 3:
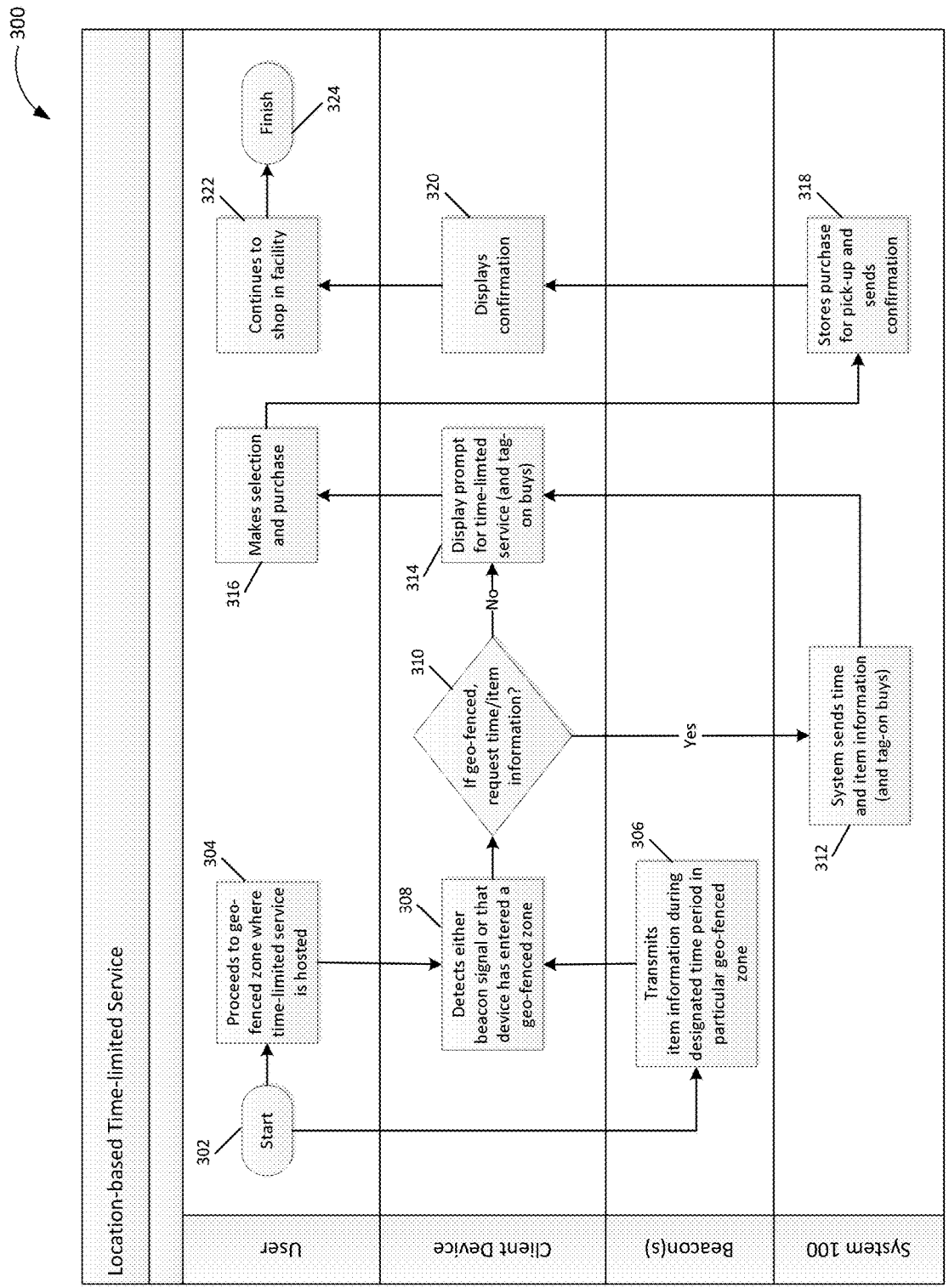
FIG. 3 is a flowchart illustrating an exemplary method for providing location-based time-limited services, according to an example embodiment.

FIG. 3 is a flowchart illustrating an exemplary method 300 for providing location-based time-limited services, according to an example embodiment. The method 300 starts at block 302 and proceeds to either block 304 or block 306. At block 302, the user with a client device proceeds to a geo-fenced zone, e.g., the first geo-fenced zone, within the facility where a time-limited service is hosted or offered. As used herein, a time-limited service refers to a sale of an item offered for a limited time, or an item offered at a sale price, discounted price, or reduced price for a limited time.

At block 306, instead of transmitting a beacon identifier, the beacons transmit item information during a designated time period in the geo-fenced zone, e.g., the first geo-fenced zone. As noted earlier, the beacons may instead transmit a beacon identifier that is used by the system to determine a location for the client device. At block 308, the client device determines that the client device entered the first geo-fenced zone (per block 304) or detects the beacon signal transmitted at block 306.

At block 310 the client device determines whether the client device entered the geo-fenced zone per block 304. If block 310 evaluates yes, then the method proceeds to block 312. At block 312, the location-based service system 100 sends a designated time period and item information associated with the geo-fenced zone to the client device. In an example embodiment, the system 100 also sends information for complementary items. If block 310 evaluates no, then the method proceeds to block 314. At block 314, the client device displays a prompt for the time-limited service. In an example embodiment, the client device also displays information for complementary items.

At block 316, the user selects one or more items to purchase based on the prompt at block 314 within the designated time period communicated in the prompt. At block 318, the system 100 processes and stores the purchase transaction for pick-up at the facility, and sends a confirmation of the purchase to the client device. At block 320, the client device displays the confirmation. At block 322, the user may continue to shop for other items in the facility. The method 300 ends at block 324.

In one embodiment, the user may be offered a complementary item whose sale price is dynamically determined. For example, the sale price of the complementary item may be based on the price of the item associated with the geo-fenced zone so that the percentage of a discount for the complementary item may increase based on the value of the item associated with the geo-fenced zone (i.e. more expensive items lead to bigger discounts on the complementary item). In another embodiment, the complementary item may be discounted based on a purchase history of the user (i.e. more frequent customers or customers who have previously spent large amounts qualify for larger discounts). In another embodiment, the sale price of the complementary item may be based on inventory available at the store. In another embodiment, the sale price of the complementary item may be based on a sale strategy to ensure that the items are sold, for example to meet a forecasted sale trend, before an expiry date, before the end of a season for seasonal items, etc. It will be appreciated that the exact amounts of such discounts are implementation-specific and will vary based on the particular needs of the facility. It should further be appreciated that the above examples are illustrative and other techniques for dynamically determining sale prices for complementary items are also within the scope of the present invention.

Figure 4:
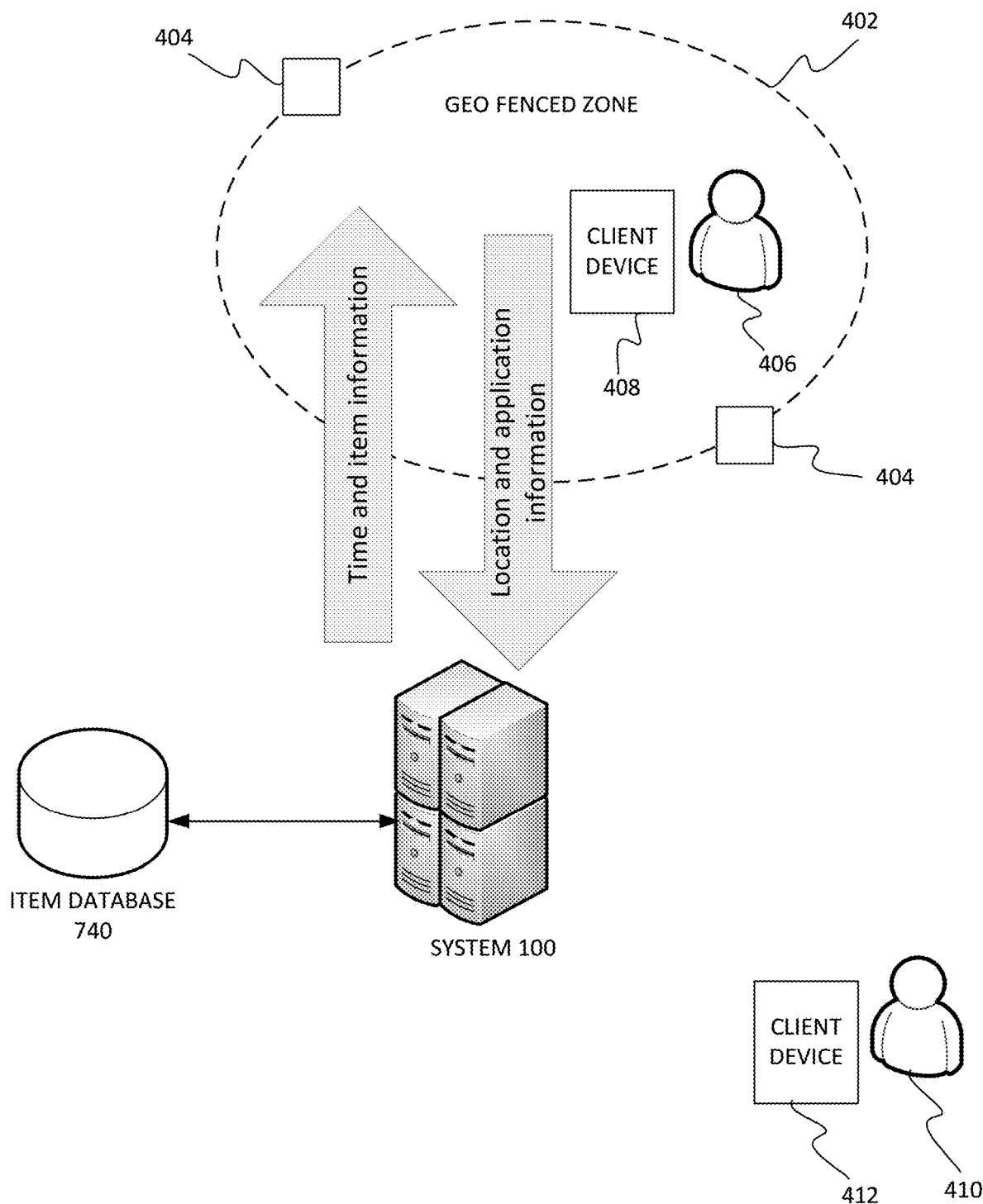
FIG. 4 schematically depicts an exemplary environment for providing location-based time-limited services, according to an example embodiment.

FIG. 4 schematically depicts an exemplary environment for providing location-based time-limited services, according to an example embodiment. As described above, a geo-fenced zone 402 is defined within a facility using one or more beacons, e.g., beacons 402. A user 406 enters the geo-fenced zone 402 with client device 408. When the client device 408 location is within the geo-fenced zone 402, the location-based service system 100 transmits item information and a designated time period for a time-limited service to the client device 408. The client device 408 sends location information to the system 100 to enable the system 100 to determine which item information to communicate to the client device 408. The client device 408 also sends information from the application installed on the client device 408. The application information may include user identifying information, item identifying information, and the like. The system 100 retrieves item information from an item database, for example item database 740 (FIG. 7). As shown in FIG. 4, user 410 and client device 412 are outside of the geo-fenced zone 402, and therefore do not receive any communications regarding a time-limited service from the system 100.

Figure 5:
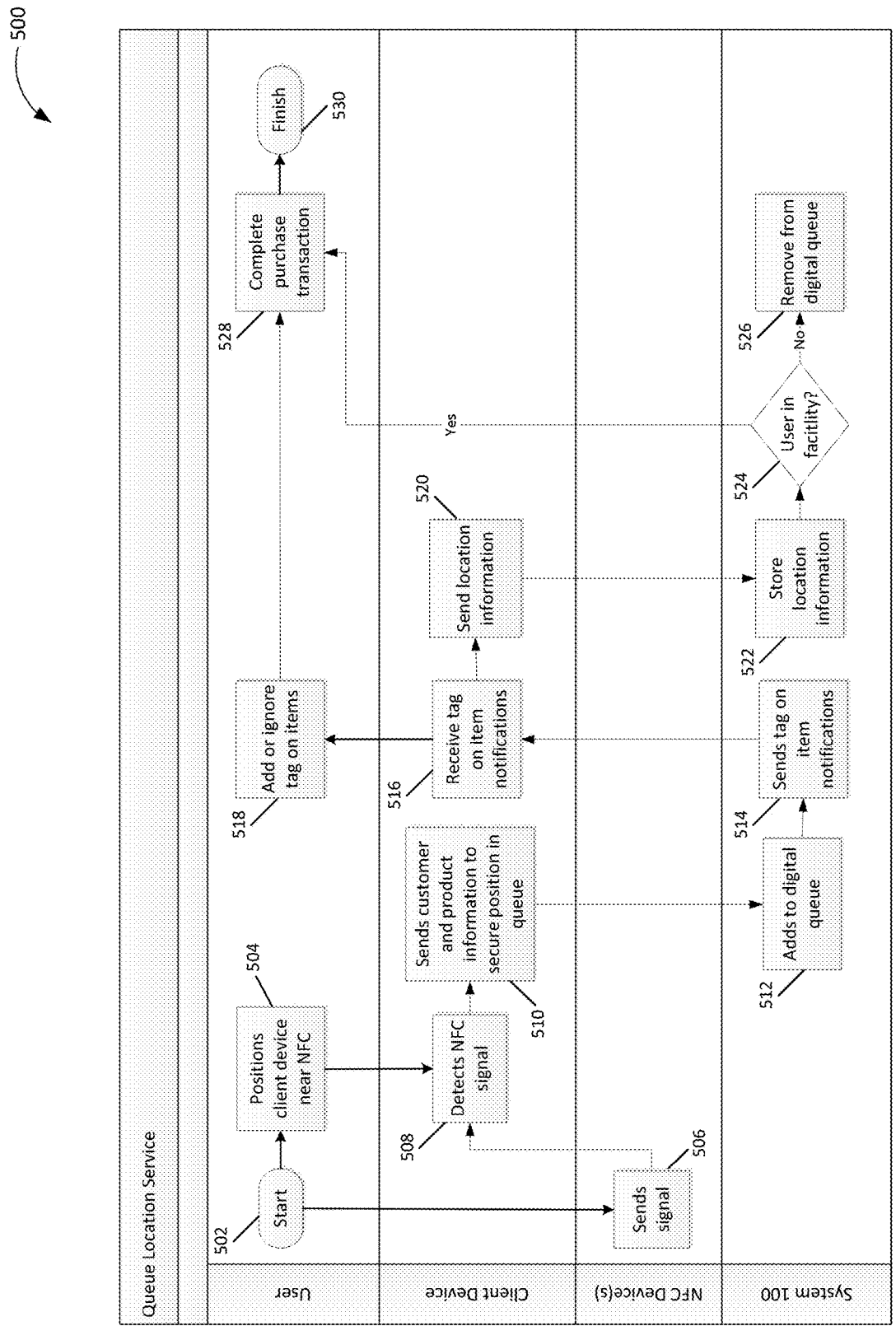
FIG. 5 is a flowchart illustrating an exemplary method for providing queue location services, according to an example embodiment.

FIG. 5 is a flowchart illustrating an exemplary method 500 for providing queue location services, according to an example embodiment. In an example embodiment, the method 500 may be performed using one or more modules described in relation to FIG. 1. The method 500 begins at block 502 and proceeds to either block 504 or block 506. At block 504, the user positions a client device (e.g., client device 710 or 720 of FIG. 7) near a NFC device (e.g., NFC device 760 or 765 of FIG. 7). At block 506, the NFC device module 130 sends a signal to the client device. At block 508, the client device detects the signal from the NFC device. The NFC device also transmits a product identifier identifying the product associated with the NFC device to the client device.

At block 510, the client device transmits the product identifier received from the NFC device to the system 100. The client device also transmits a user identifier or customer information to the system 100 to secure the user's position in the queue for the item. The user identifier or customer information at least includes data that identifies the user of the client device. For example, the user identifier or customer information may be a username of the user, first and last name of the user, a phone number of the user, a unique identifier number for the user, or other identifying data. The user identifier or customer information may be retrieved from the client device's memory. The product information may be retrieved from the signal from the NFC device. For example, the signal from the NFC device may include a product identifier number for a product associated with the NFC device. The client device may also transmit time and location information to the system 100 to secure the user's position in the queue. The time information may indicate the time the client device detects a signal from the NFC device, and the location information may indicate the location where the client device detects a signal from the NFC device. In some embodiments, the client device may also transmit account information to the system 100 to secure the user's position in the queue.

At block 512, the queue service module 140 adds the user to a digital queue for the item associated with the NFC device. The digital queue may be stored in a database, for example, queue database 745. In an example embodiment, the digital queue is stored in the database by storing a product identifier number as an index, and storing the customer identifier (retrieved from the client device) and the user's position in the queue in data fields associated with the index. The complementary items module 150 sends information for complementary items to the client device. The client device receives the complementary items information (block 516). At block 518, the user can add one or more complementary items to a purchase transaction that includes purchase of the item associated with the NFC device, or the user can ignore the complementary items (that is, not purchase the complementary items).

At block 520, the client device sends location information of the client device to the system 100. The location information may be determined using a GPS included in the client device, or using other location determination mechanisms, for example, Wi-Fi triangulation. At block 522, the queue service module 140 stores location information. At block 524, the queue service module 140 determines if the client device is within the facility to determine the client device's continued eligibility for the transaction. If the client device is not in the facility, then at block 526 the queue service module 140 removes the user from the digital queue. If the client device is in the facility, then the user is allowed to complete the purchase transaction at block 528 for the product associated with the NFC device. In some embodiments, the user is prompted to complete the purchase transaction when it is his or her turn according to the digital queue managed by the system 100. In an example embodiment, the user is not allowed to complete the purchase at a later time. If the user does not complete the purchase when prompted, then he may give up his position in the queue, and the next user is prompted to complete the purchase. The method ends at block 530.

In an example embodiment, the digital queue for a product is closed (that is, no more users are added to queue) based on the product inventory available at the facility. That is, the number of spots available in the digital queue corresponds to the quantity of product associated with the NFC device available in the store for purchase. In an example embodiment, when the queue is closed, a digital waitlist queue may be created, and users may be added to the waitlist queue. In case a user drops out of the digital queue for the product (because he or she leaves the facility or does not complete the purchase when prompted) and a spot in the queue is open, the system 100 adds a user from the waitlist queue to the digital queue for the product. In some embodiments, the queue services module 140 is configured to manage the digital queue, and manage and store data related to the digital queue, including number of users in the queue, quantity of items/product available in inventory at the facility, user declining or purchasing the item when prompted, and the like. The queue services module 140 may store this data within the same data structure as the digital queue, or may store the data in a separate data structure.

In this manner, the user can enter a digital queue to purchase an item within a facility by being in physical proximity of a NFC device associated with the product. Once the user enters the digital queue, he or she is free to continue shopping within the facility without the need to physically stand in queue to purchase an item offered in limited quantities.

Exemplary NFC devices include, but are not limited to, portable electronic devices capable of near-field communications such as smartphones, mobile devices, beacons, and other devices.

Figure 6:
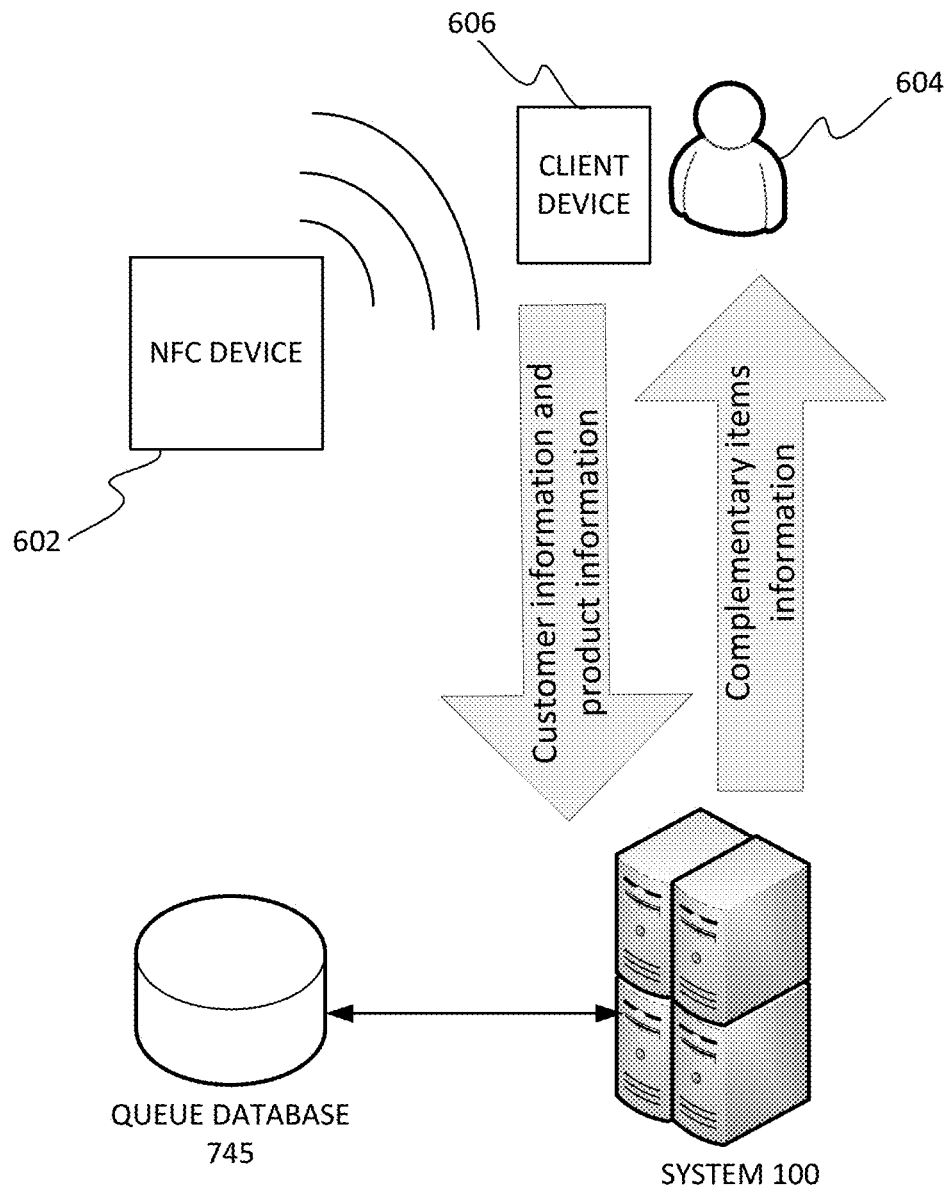
FIG. 6 schematically depicts an exemplary environment for providing queue location-services, according to an example embodiment.

FIG. 6 schematically depicts an exemplary environment for providing queue location-services, according to an example embodiment. As described above, a NFC device 602 is disposed within a facility. A user 604 positions client device 606 near the NFC device 602. The client device detects a signal from the NFC device 602. In response to detecting the signal, the client device communicates customer information and product information to the location-based service system 100. The product information may be included in the signal received from the NFC device 602. The system 100 adds the user to a digital queue for the product associated with the NFC device 602. The system 100 may store a digital queue in a database, for example queue database 765 (FIG. 7). The system 100 communicates information for complementary items to the client device.

In an example embodiment, to efficiently process requests from the client device to add a user to the digital queue, multiple-thread listeners may be employed by the server. The multiple-thread listeners may be configured for parallel or serial processing, and may be configured to listen for a client device detecting the signal from the NFC device. In one embodiment, the requests from the client devices for the digital queue may be processed using a message queue. For example, the system 100 may inform the user, via the client device, that he or she has been added to the queue, and queue a message to process the request at the server and database at a later time. Hence, the user need not wait near the NFC device for the system 100 and database to process the request. Multiple listeners are implemented in the server, and one or more listeners may be active, while other listeners are inactive at a given time. If the active listeners are not available to process a request, then one or more of the inactive listeners are activated to handle the request load.

FIG. 7 illustrates a network diagram depicting a system 700 for implementing the location-based service system, according to an example embodiment. The system 700 can include a network 705, multiple client devices, for example, client device 710, client device 720, server 730, multiple databases, for example, an item database(s) 740, queue database(s) 745, multiple beacons defining multiple geo-fenced zones, for example beacon(s) 750, beacon(s) 755, and multiple NFC devices, for example, NFC device 760 and NFC device 765. Each of the client devices 710, 720, server 730, database(s) 740, 745, beacons 750, 755, and NFC devices 760, 765 is in communication with the network 705.

In an example embodiment, one or more portions of network 705 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The client devices 710, 720 may comprise, but are not limited to, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, and the like. Each of client devices 710, 720 may connect to network 705 via a wired or wireless connection. In an example embodiment, the client devices 710, 720 may perform one or more of the functionalities of the location-based service system 100 described herein, or transmit data or signals to the location-based service system 100 described herein. The client device 710, 720 can include one or more components of computing device 700 of FIG. 7. The client device 710, 720 may be carried by a user into a facility and within a geo-fenced zone or near a NFC device according to exemplary embodiments described herein.

In an example embodiment, the location-based service system 100 may be included at least in part on the client device 710, 720, and the client device 710, 720 performs one or more of the functionalities of the system described herein. In an example embodiment, the location-based service system 100 may be included at least in part on the server 730, and the server 730 performs one or more of the functionalities of the location-based service system 100 described herein.

One or more beacons 750, 755 may be connected to the network 705 via a wired connection. Alternatively, one or more of the beacons 750, 755 may be connected to the network 705 via a wireless connection. A set of beacons 750 may define a first geo-fenced zone in the facility, and a set of beacons 755 may define a second geo-fenced zone in the facility.

Each of NFC device 760, 765 are connected to the network 705 via a wired connection. Alternatively, one or more of the NFC device 760, 765 may be connected to the network 705 via a wireless connection.

The item database(s) 740 comprise one or more storage devices for storing data and/or instructions (or code) for use by server 740 and/or client devices 710, 720. In an example embodiment, the item database(s) 740 stores data related to various items, including items offered for sale for a limited time, items offered at a sale price (discounted price or reduced price) for a limited time, and items available in limited quantities. The item database(s) 740 may include a description, price information, and inventory information for each item offered for sale within a facility. In an example embodiment, only items in the facility's inventory are offered for sale via the location-based service system 100.

The queue database(s) 745 include one or more storage devices for storing data and/or instructions (or code) for use by server 730 and/or client devices 710, 720. In an example embodiment, the queue database(s) 745 stores data related to a users' positions in digital queues to purchase various product that may be offered in limited quantities within the facility.

Each of the database(s) 740, 745, and server 730 is connected to the network 705 via a wired connection. Alternatively, one or more of the database(s) 740, and server 730 may be connected to the network 705 via a wireless connection. Server 730 comprise one or more computers or processors configured to communicate with client devices 710, 720 via network 705. The server 730 can include one or more components of device 800 of FIG. 8. Server 730 hosts one or more software systems, applications or websites, including the location-based service system described herein and a purchase transaction system accessed by client devices 710, 720 and/or facilitates access to the content of database(s) 740, 745. Database(s) 740, 745 and server 730 may be located at one or more geographically distributed locations from each other or from client devices 710, 720. Alternatively, database(s) 740, 745 may be included within server 730.

Figure 8:
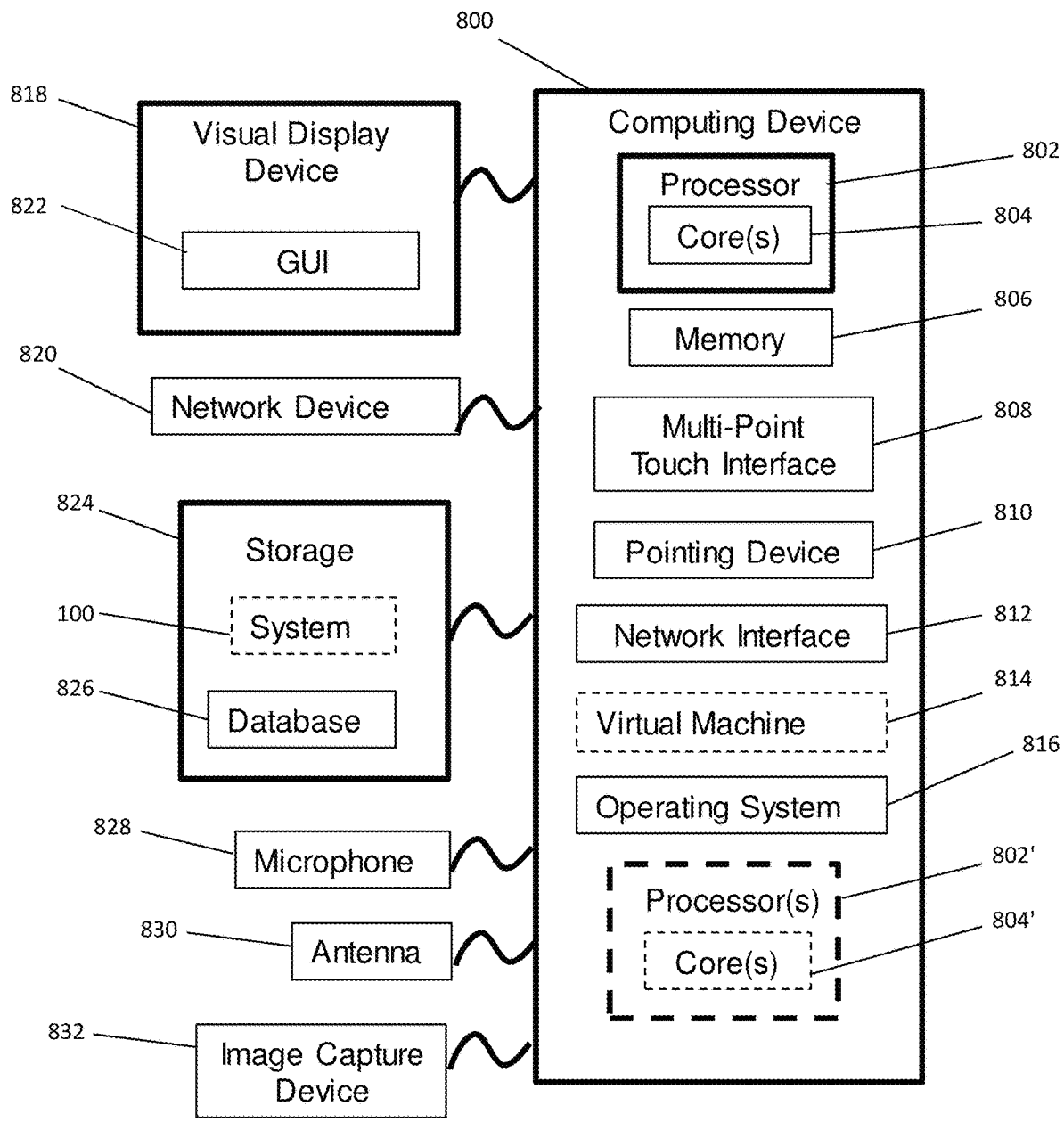
FIG. 8 is a block diagram of an exemplary computing device that may be used to implement exemplary embodiments described herein.

FIG. 8 is a block diagram of an exemplary computing device 800 that can be used to perform one or more steps of the methods provided by exemplary embodiments. For example, computing device 800 may be, but is not limited to, client device 710, 720 and server 730 as described in FIG. 7. The computing device 800 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 806 included in the computing device 800 can store computer-readable and computer-executable instructions or software for implementing exemplary embodiments. The computing device 800 also includes processor 802 and associated core 804, and optionally, one or more additional processor(s) 802' and associated core(s) 804' (for example, in the case of computer systems having multiple processors/cores), for executing computer-readable and computer-executable instructions or software stored in the memory 806 and other programs for controlling system hardware. Processor 802 and processor(s) 802' can each be a single core processor or multiple core (804 and 804') processor.

Virtualization can be employed in the computing device 800 so that infrastructure and resources in the computing device can be shared dynamically. A virtual machine 814 can be provided to handle a process running on multiple processors so that the process appears to be using only one computing resource rather than multiple computing resources. Multiple virtual machines can also be used with one processor.

Memory 806 can include a computer system memory or random access memory, such as DRAM, SRAM, EDO RAM, and the like. Memory 806 can include other types of memory as well, or combinations thereof. A user can interact with the computing device 800 through a visual display device 818, such as a touch screen display or computer monitor, which can display one or more user interfaces 819. The visual display device 818 can also display other aspects, elements and/or information or data associated with exemplary embodiments. The computing device 800 can include other I/O devices for receiving input from a user, for example, a keyboard or any suitable multi-point touch interface 808, a pointing device 810 (e.g., a pen, stylus, mouse, or trackpad). The keyboard 808 and the pointing device 810 can be coupled to the visual display device 818. The computing device 800 can include other suitable conventional I/O peripherals.

The computing device 800 can also include one or more storage devices 824, such as a hard-drive, CD-ROM, or other computer readable media, for storing data and computer-readable instructions and/or software, such as one or more modules of the system 100 shown in FIG. 1 that implements exemplary embodiments of the notification system as described herein, or portions thereof, which can be executed to generate user interface 819 on display 818. Exemplary storage device 824 can also store one or more databases for storing any suitable information required to implement exemplary embodiments. The databases can be updated by a user or automatically at any suitable time to add, delete or update one or more items in the databases. Exemplary storage device 824 can store one or more databases 826 for storing provisioned data, and other data/information used to implement exemplary embodiments of the systems and methods described herein.

The computing device 800 can include a network interface 812 configured to interface via one or more network devices 822 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 812 can include a built-in network adapter, network interface card, PCMCIA network card, card bus network adapter, wireless network adapter, USB network adapter, modem or any other device suitable for interfacing the computing device 800 to any type of network capable of communication and performing the operations described herein. Moreover, the computing device 800 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 800 can run any operating system 816, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 816 can be run in native mode or emulated mode. In an exemplary embodiment, the operating system 816 can be run on one or more cloud machine instances.

The following description is presented to enable any person skilled in the art to create and use a computer system configuration and related method and systems for providing location-based services to a user. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

What is claimed is:

1. A system for providing location-based time-limited services, the system comprising:
   one or more beacons disposed at first locations within a facility, the beacons defining a first geo-fenced zone within a portion of the facility that is less than all of the facility, wherein an item for sale is associated with the first geo-fenced zone; and
   a server equipped with a processor configured to execute a dynamic notification module that when executed:
   receives a notification that a client device associated with a user is within the first geo-fenced zone and determines that the client device meets designated criteria based on the client device interacting with the one or more beacons at a designated time,
   transmits a first message to the client device including item information for the item associated with the first geo-fenced zone in response to determining that the client device traversed the first geo-fenced zone at the designated time, the first message requesting a response at a subsequent time,
   receives a response to the first message from the client device at the subsequent time, and in response, transmits instructions to the client device to execute a time-limited service associated with the item and the portion of the facility,
   determines a dynamic sale price for a complementary item, the dynamic sale price being determined based on the user responding to the first message and at least one of a purchase history of the user or user demographic information, wherein the complementary item complements the item associated with the first geo-fenced zone, and
   transmits a second message to the client device including information for the complementary item and the dynamic sale price.

2. The system of claim 1, wherein the server is configured to transmit the second message to the client device in response to the client device executing the time-limited service.

3. The system of claim 1, further comprising:
   one or more beacons disposed at second locations within the facility, the beacons defining a second geo-fenced zone within a portion of the facility that is less than all of the facility,
   wherein the server is configured to transmit the second message to the client device based on a location of the client device traversing the second geo-fenced zone within the facility, wherein the second geo-fenced zone is in a portion of the facility where the complementary item is offered for sale.

4. The system of claim 1, wherein the dynamic notification module when executed determines that the client device is within the first geo-fenced zone based on a location of the client device within the facility.

5. The system of claim 1, wherein the dynamic notification module when executed determines that the client device is within the first geo-fenced zone based on the client device detecting a signal transmitted by the beacons and responding to the signal.

6. The system of claim 1, wherein the beacons are configured to broadcast a signal including an item identification number.

7. The system of claim 1, wherein the first message transmitted to the client device includes item information, price information, and a time period indicating when the price information begins and expires.

8. The system of claim 1, wherein the user is enabled to complete a purchase of the item when the client device is outside the first geo-fenced zone.

9. The system of claim 1, wherein the dynamic notification module when executed is configured to query an inventory database and determine whether the item is available for pickup at the facility or the item is available for delivery.

10. The system of claim 9, wherein the client device is configured to receive from the dynamic notification module and display a determination as to whether the item is available for pickup at the facility or the item is available for delivery.

11. A method for providing location-based time-limited services, the method comprising:
   disposing one or more beacons at first locations within a facility to define a first geo-fenced zone within a portion of the facility that is less than all of the facility, wherein an item for sale is associated with the first geo-fenced zone;
   receiving, at a dynamic notification module, a notification that a client device associated with a user is within the first geo-fenced zone and determining that the client device meets designated criteria based on the client device interacting with the one or more beacons at a designated time;
   transmitting a first message from the dynamic notification module to the client device including item information for the item associated with the first geo-fenced zone in response to determining that the client device traversed the first geo-fenced zone at the designated time, the first message requesting a response at a subsequent time;
   receiving a response to the first message at the dynamic notification module at the subsequent time, and in response transmitting instructions to the client device to execute a time-limited service associated with the item and the portion of the facility;
   determining a dynamic sale price for a complementary item, the dynamic sale price being determined based on the user responding to the first message and at least one of a purchase history of the user or user demographic information, wherein the complementary item complements the item associated with the first geo-fenced zone, and
   transmitting a second message to the client device including information for the complementary item and the dynamic sale price for the complementary item.

12. The method of claim 11, wherein the second message is transmitted to the client device in response to the client device executing the time-limited service.

13. The method of claim 11, further comprising:
   disposing one or more beacons at second locations within a facility, the beacons defining a second geo-fenced zone within a portion of the facility that is less than all of the facility, and
   wherein the second message is transmitted to the client device based on a location of the client device traversing the second geo-fenced zone within the facility, wherein the second geo-fenced zone is in a portion of the facility where the complementary item is offered for sale.

14. The method of claim 11, further comprising determining, at the dynamic notification module, that the client device is within the first geo-fenced zone based on a location of the client device within the facility.

15. The method of claim 11, further comprising determining, at the dynamic notification module, that the client device is within the geo-fenced zone based on the client device detecting a signal transmitted by the beacons and responding to the signal.

16. The method of claim 11, further comprising broadcasting a signal from the beacons, wherein the signal includes an item identification number.

17. The method of claim 11, wherein the first message transmitted to the client device includes item information, price information, and a time period indicating when the price information begins and expires.

18. The method of claim 11, further comprising enabling the user, via the client device, to complete a purchase of the item when the client device is outside the first geo-fenced zone.

19. A non-transitory machine-readable medium storing instructions executable by a processing device, wherein execution of the instructions causes the processing device to implement a method for providing location-based time-limited services, the method comprising:
   transmitting a signal from one or more beacons disposed at first locations within a facility, the beacons defining a first geo-fenced zone within a portion of the facility that is less than all of the facility, wherein an item for sale is associated with the first geo-fenced zone;
   receiving a notification that a client device associated with a user is within the first geo-fenced zone and determining that the client device meets designated criteria based on the client device interacting with the one or more beacons at a designated time;
   transmitting a first message to the client device including item information for the item associated with the first geo-fenced zone in response to determining that the client device traversed the first geo-fenced zone at the designated time, the first message requesting a response at a subsequent time;
   receiving a response to the first message from the client device at the subsequent time, and in response transmitting instructions to the client device to execute a time-limited service associated with the item and the portion of the facility;
   determining a dynamic sale price for a complementary item, the dynamic sale price being determined based on the user responding to the first message and at least one of a purchase history of the user or user demographic information, wherein the complementary item complements the item associated with the first geo-fenced zone; and
   transmitting a second message to the client device including information for the complementary item and the dynamic sale price.

20. The non-transitory machine-readable medium of claim 19, further comprising determining that the client device is within the first geo-fenced zone based on the client device detecting the signal transmitted by the beacons and responding to the signal.

* * * * *